(No Model.)

E. G. EYSTER.
BROOM HOLDER.

No. 279,481. Patented June 12, 1883.

Attest:
Courtney A. Cooper
J. E. Hansmann

E. G. Eyster
Inventor:
By Charles E. Foster
Attorney.

UNITED STATES PATENT OFFICE.

EDWARD G. EYSTER, OF YORK, PENNSYLVANIA, ASSIGNOR OF ONE-HALF TO JACOB D. MILLER, OF SAME PLACE.

BROOM-HOLDER.

SPECIFICATION forming part of Letters Patent No. 279,481, dated June 12, 1883.

Application filed October 4, 1882. (No model.)

*To all whom it may concern:*

Be it known that I, EDWARD G. EYSTER, a citizen of the United States, and a resident of York, in the county of York and State of Pennsylvania, have invented certain new and useful Improvements in Broom-Holders, of which the following is a specification.

My invention relates to devices for suspending brooms, brushes, or other similar articles; and it consists in a simple, cheap, and effective device, capable of easy attachment to a wall or other suitable place, so constructed as to grip or clamp the handle of the broom or other implement in such a manner as to securely hold the same in suspension.

Figure 1:
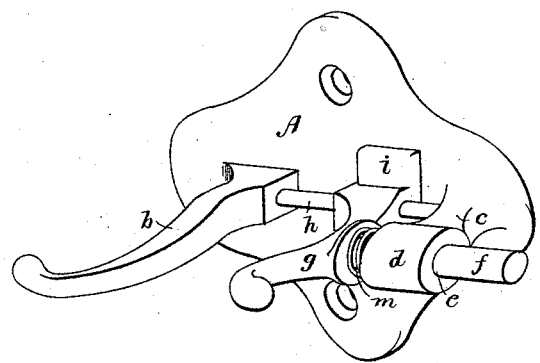
Figure 2:
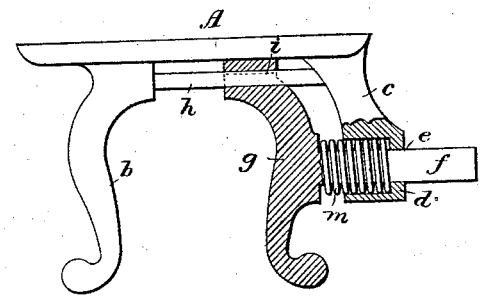

In the drawings forming part of this specification, Figure 1 is a perspective view of my improved broom-holder; and Fig. 2 is a top view, showing the device partly in section.

A represents a metallic plate of any suitable shape, provided with two outwardly-projecting curved arms, $b\ c$, which form a part of the said plate, and may be cast in one piece with the same. On the end of the arm $c$ is formed a bearing or hub, $d$, which has an opening, $e$, for the reception of a pin, $f$, on an adjustable arm, $g$. The arm $g$ has a notch or opening in its inner end to receive a guide rib or rod, $h$, which is secured to or projects from the plate A. A spring, $m$, encircles the pin $f$, and is interposed between the hub $d$ on the arm $c$ and the adjustable arm $g$, and forces the latter against the arm $g$, thereby providing an effective clamp, yet at the same time permitting of an easy insertion or withdrawal of the handle of the article to be held. From the inner end of the arm $g$, at the sides, project feet $i\ i$, which serve to prevent the tilting or turning of the arm without interfering with its sliding movement. The plate A is provided with two or more screw or bolt holes, so as to afford a means of fastening the device to a wall or any other suitable place.

I am aware that broom-holding devices have heretofore been provided with spring-sections adapted to clutch against and retain the handle of the broom; hence I do not claim this, broadly; but

I claim—

1. In a broom or brush support, a plate provided with a fixed arm and a movable arm arranged to slide laterally on the plate to and from the fixed arm, and a spring whereby the movable arm is carried toward the fixed arm, as and for the purpose described.

2. The combination, in a broom or brush support, of the plate A, having two arms, $b\ c$, and a guide-rod, $h$, an adjustable arm, $g$, a pin, $f$, and a spring, $m$, as and for the purpose set forth.

3. The combination of the plate A, its two fixed arms $b\ c$ and rod $h$, and the slide-arm $g$, supported by the arm $c$, and provided with feet $i\ i$, as specified.

In testimony whereof I have signed my name to this specification in the presence of two subscribing witnesses.

ED. G. EYSTER.

Witnesses:
 LATIMER I. EWING,
 ALBERT GALER.